United States Patent
Sumiyoshi et al.

(10) Patent No.: US 6,842,209 B2
(45) Date of Patent: Jan. 11, 2005

(54) LIQUID CRYSTAL DISPLAY DEVICE HAVING SWITCHABLE REFLECTIVE LAYER

(75) Inventors: Ken Sumiyoshi, Tokyo (JP); Hiroshi Hayama, Tokyo (JP)

(73) Assignee: NEC Corporation, Tokyo (JP)

( * ) Notice: Subject to any disclaimer, the term of this patent is extended or adjusted under 35 U.S.C. 154(b) by 58 days.

(21) Appl. No.: 10/332,472

(22) PCT Filed: Jul. 9, 2001

(86) PCT No.: PCT/JP01/05934
§ 371 (c)(1),
(2), (4) Date: Jan. 9, 2003

(87) PCT Pub. No.: WO02/05020
PCT Pub. Date: Jan. 17, 2002

(65) Prior Publication Data
US 2004/0021809 A1 Feb. 5, 2004

(30) Foreign Application Priority Data
Jul. 11, 2000 (JP) .................... 2000-209802

(51) Int. Cl.[7] .......................................... G02F 1/1335
(52) U.S. Cl. ...................................... 349/115; 349/114
(58) Field of Search ................................. 349/114, 115

(56) References Cited

U.S. PATENT DOCUMENTS

| | | | |
|---|---|---|---|
| 4,059,916 A | * | 11/1977 | Tachihara et al. ............. 40/448 |
| 4,844,569 A | * | 7/1989 | Wada et al. ................. 349/117 |
| 5,132,830 A | * | 7/1992 | Fukutani et al. ............ 349/106 |
| 5,663,816 A | * | 9/1997 | Chen et al. ................... 359/15 |
| 5,668,649 A | * | 9/1997 | Suzuki et al. ................. 349/42 |
| 5,686,979 A | * | 11/1997 | Weber et al. ................. 349/96 |
| 5,841,492 A | * | 11/1998 | Iwauchi et al. ............... 349/74 |
| 5,841,494 A | * | 11/1998 | Hall ............................. 349/98 |
| 6,570,633 B1 | * | 5/2003 | Stephenson .................. 349/86 |
| 6,690,438 B2 | * | 2/2004 | Sekiguchi .................... 349/114 |

FOREIGN PATENT DOCUMENTS

| | | |
|---|---|---|
| JP | 8-076104 | 3/1996 |
| JP | 8-179320 | 7/1996 |
| JP | 8-304848 | 11/1996 |
| JP | 9-080432 | 3/1997 |
| JP | 10-253948 | 9/1998 |
| JP | 11-119026 | 4/1999 |
| JP | 11-142810 | 5/1999 |
| JP | 11-316373 | 11/1999 |
| JP | 2000-122059 | 4/2000 |
| JP | 2001-4997 | 1/2001 |

OTHER PUBLICATIONS

JP 08–179320, Jul. 12, 1996, Kato et al., machine–translation.*

* cited by examiner

Primary Examiner—Tarifur R. Chowdhury
Assistant Examiner—Andrew Schechter
(74) Attorney, Agent, or Firm—Young & Thompson

(57) ABSTRACT

A liquid crystal display device comprising a first polarizing sheet (16a), a color filter layer (6) formed on glass sheet (18), a second polarizing sheet (16b), three-layered HPDLC (17) formed below the liquid crystal layer (1) and acting as a reflective structural layer having a reflectivity changed electrically, and a backlight unit as the lowermost layer. Each layer of the three-layered HPDLC (17) is composed of a liquid crystal droplet layer polymer layer and reflects blue, green, red by Bragg reflection. When voltage is applied to the three-layered HPDLC (17), the reflectivity of liquid crystal droplet layer of each layer change, so that the HPDLC can be made transparent by equalizing the reflectivities of the liquid crystal liquid droplet layer to those of polymer layers.

17 Claims, 11 Drawing Sheets ambient light 4
liquid crystal layer 1
alternately stacked structural layer 9
10
liquid crystal drop layer
11
polymer layer
3 backlight unit 5 back light
9 ambient light 4
1
first alternately stacked structural layer
9a
9b
second alternately stacked structural layer
3 backlight unit 1
5 back light
9a
9b
3

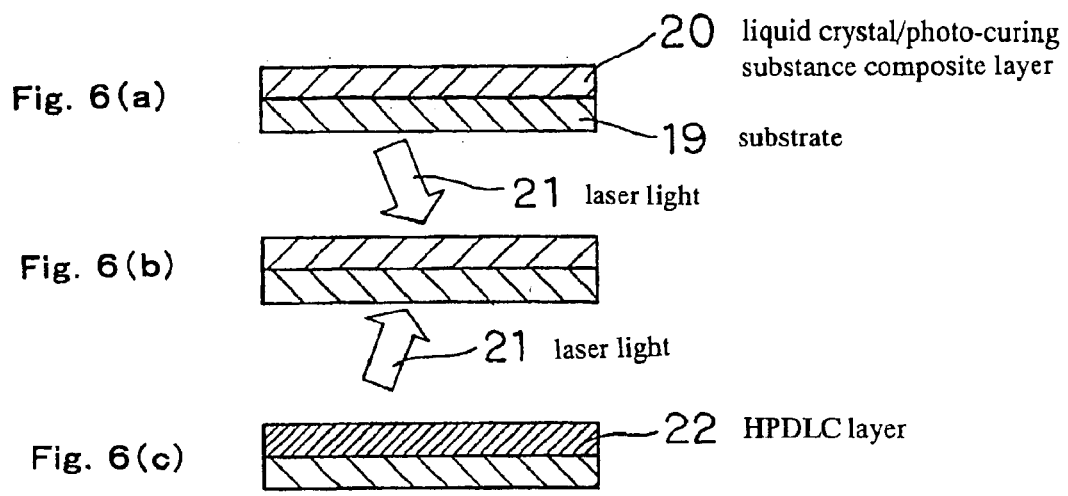
Fig. 6(a) 20 liquid crystal/photo-curing substance composite layer
19 substrate
21 laser light
Fig. 6(b) 21 laser light
Fig. 6(c) 22 HPDLC layer
Fig. 7
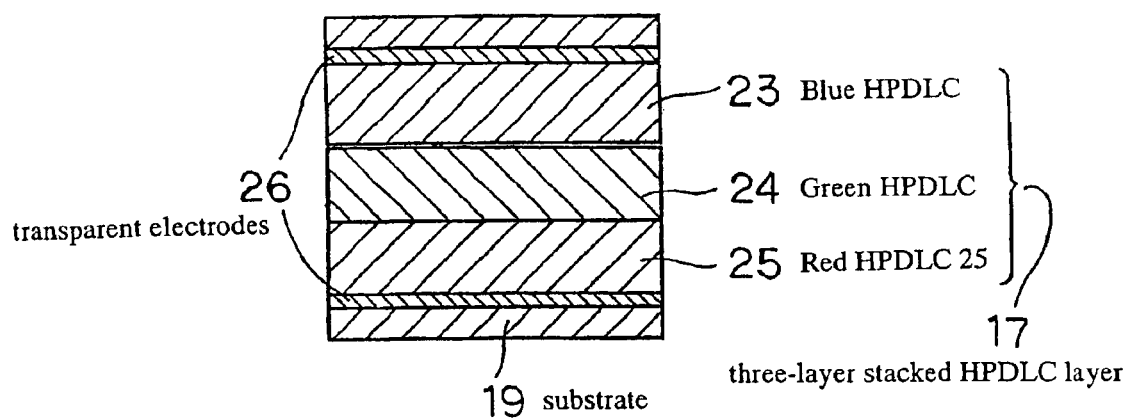
23 Blue HPDLC
24 Green HPDLC
25 Red HPDLC 25
26 transparent electrodes
19 substrate
17 three-layer stacked HPDLC layer

- 216a  first polarizer
- 215   color filter substrate
- 206a  first color filter layer
- 201   liquid crystal layer
- 218   glass
- 217   three-layer stacked HPDLC
- 216b  second polarizer
- 206b  second color filter layer
- 203   backlight unit Fig. 12(a)
Fig. 12(b)
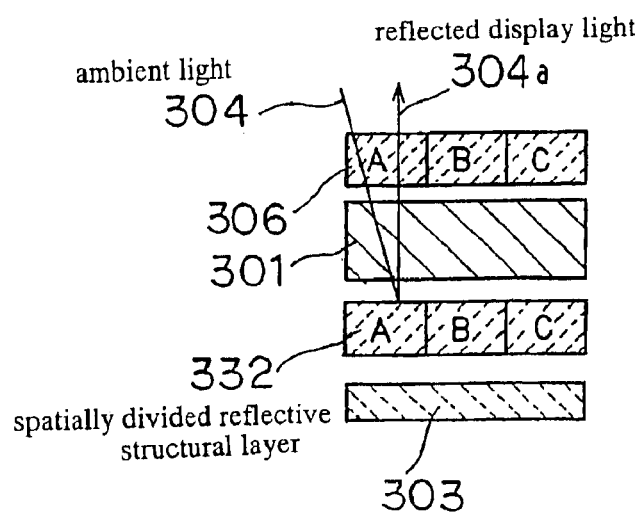
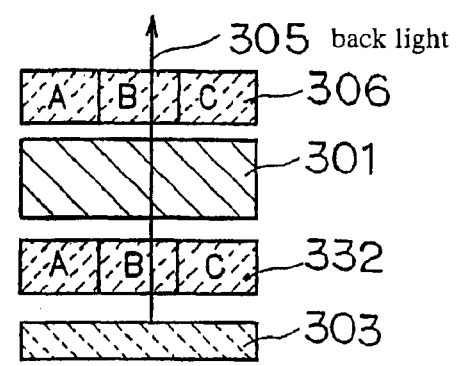
Fig. 13
(PRIOR ART)
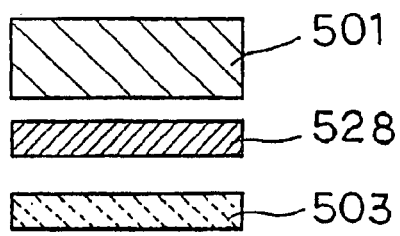

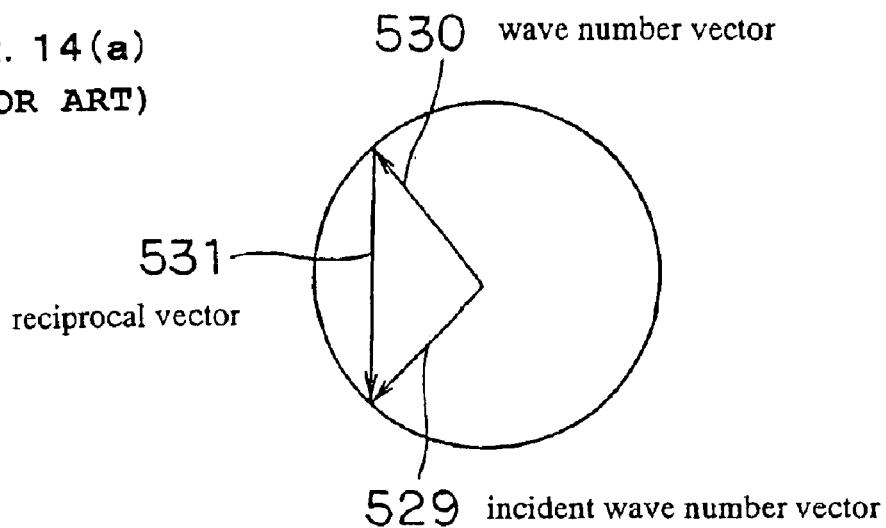
Fig. 14(a) (PRIOR ART)
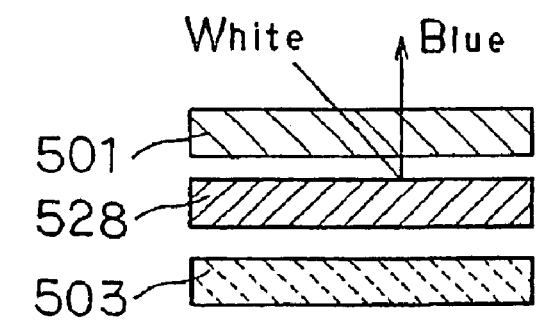
Fig. 14(b) (PRIOR ART)
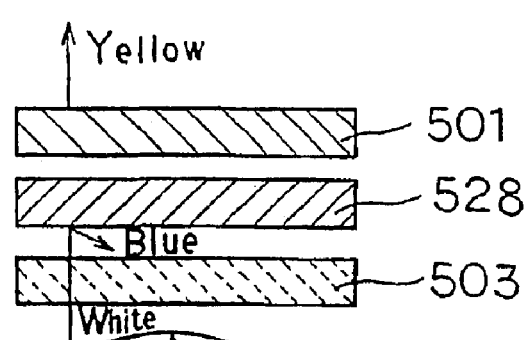
Fig. 14(c) (PRIOR ART)
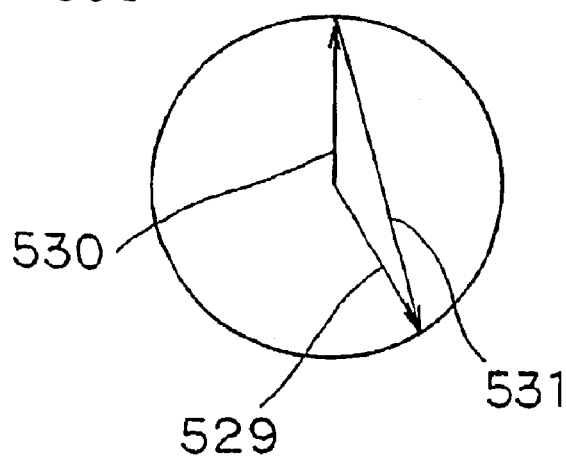
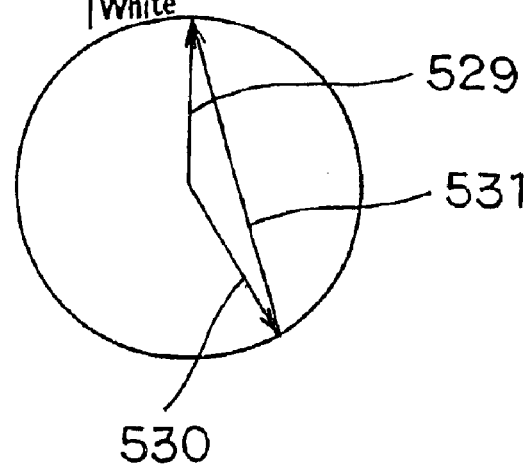

LIQUID CRYSTAL DISPLAY DEVICE HAVING SWITCHABLE REFLECTIVE LAYER

TECHNICAL FIELD

The present invention relates to a liquid crystal display device for displaying information,

BACKGROUND ART

Reflective liquid crystal displays have come into widespread use in portable applications due to their low power consumption. In particular, reflective liquid crystal display devices capable of full-color display are now under development.

A reflective liquid crystal display device uses ambient light as a light source and can provide display with high picture quality when used outside in sunlight, in contrast, the display of a transmissive liquid crystal display device generally suffers from low contrast and poor visibility when used outside in sunlight. However, the visibility of a reflective liquid crystal display device is poor when used outside at night or in a room with poor lighting and cannot obtain the image quality that is possible in a transmissive liquid crystal display device.

A liquid crystal display device is therefore desired that is capable of reflective display in a bright setting and that can display using a supplementary light source in a dark setting. A semi-transmissive liquid crystal display device can be offered as one example. Such a semi-transmissive liquid crystal display device employs a reflecting surface that reflects incident light as a semi-transmissive surface. However, a semi-transmissive surface having, for example, transmittance of 50% and reflectance of 50% has the disadvantage that display is dark during both reflective display and transmissive display.

A liquid crystal display device that can be switched between reflective and transmissive display is disclosed in Japanese Patent Laid-open No. 119026/99 as a device for overcoming the above-described disadvantage. FIG. 13 shows a schematic side sectional view of a liquid crystal display device that includes a holographic reflecting layer. As shown in FIG. 13, holographic reflecting layer 528, which is a volume hologram, is arranged between backlight unit 503 and liquid crystal layer 501.

This volume hologram is a structure having fixed refractive index modulation, and when the period of this modulation is at the level of visible wavelengths, produces diffraction known as Bragg reflection, whereby light of a particular angle of incidence and a particular wavelength is strongly reflected in a specific direction. This hologram function and the characteristics of a liquid crystal display device having a prior-art holographic reflecting layer can be explained using the circular charts shown in FIG. 14. The radius of the circle shown in FIG. 14(a) is given as n/λ. Here, λ is the wavelength of incident light, and n is the average refractive index of the hologram medium. The incident light is represented as a vector from the center to the circumference of the circle. Incident wave number vector 529 and reciprocal vector 531 are arranged as in FIG. 14(a). The direction of reciprocal vector 531 is defined as the modulation direction of the refractive modulation, and the magnitude of the vector is defined as the inverse of the modulation period. In FIG. 14(a), emitted wave number vector 530 is shown as the difference between incident wave number vector 529 and reciprocal vector 531. Light is strongly emitted in the direction of this emitted wave number vector 530.

Explanation next regards the reflective action using FIG. 14(b). During reflective display, display is realized by only incident light, and backlight unit 503 is not used. Incident light from the surroundings is incident to liquid crystal layer 501 and then incident to holographic reflecting layer 528. If the reciprocal vector of holographic reflecting layer 528 is arranged as shown in FIG. 14(b), only a specific wavelength is selectively reflected in a specific emission direction. The light that is selectively reflected again passes through liquid crystal layer 501 to enable reflective display. Light of wavelengths other than this selectively reflected wavelength is transmitted by holographic reflecting layer 528 and therefore does not contribute to display.

When the surroundings are dark, on the other hand, the backlight is lit up. In this case, the light from the backlight is transmitted by holographic reflecting layer 528 and is incident to liquid crystal layer 501, whereby transmissive display can be realized as shown in FIG. 14(c).

Using the liquid crystal display device that is disclosed in Japanese Patent Laid-open No. 119026/1999 as described above enables display that switches between reflective and transmissive display.

Nevertheless, the liquid crystal display device that is disclosed in the above-described Japanese Patent Laid-open No. 119026/1999 has the disadvantage that the displayed colors during reflective display differ from the displayed colors during transmissive display. More specifically, as shown in FIG. 14(b), only light of a specific wavelength that is determined by the hologram is reflected during reflective display. And as a result, only monochromatic display is possible during reflective display. Further, as shown in FIG. 14(c), during transmissive display, specific wavelengths of the light from the backlight undergo Bragg reflection by the hologram and cannot contribute to transmissive display. The wavelengths that are subject to this Bragg reflection are identical to the wavelength of monochromatic light during reflective display. Thus, even though a color such as green can be displayed during reflective display, the complementary color of green must be displayed during transmissive display. For similar reasons, full-color display is not possible.

Thus, although the liquid crystal display device that is disclosed in Japanese Patent Laid-open No. 119026/1999 realizes display that can be switched between reflective and transmissive display, such a display has the disadvantages that color display is limited and full-color display is not possible.

It is therefore an object of the present invention to provide a liquid crystal display device that employs Bragg reflection and that can realize full-color reflective display in bright surroundings and full-color transmissive display in dark surroundings.

DISCLOSURE OF INVENTION

To achieve the above-described object, the liquid crystal display device of the present invention includes:

a liquid crystal layer;

a reflective structural layer that is arranged below the liquid crystal layer and that includes a plurality of reflectors for reflecting only light of specific frequency bands by means of Bragg reflection, wherein the reflectance of each of the reflectors can be electrically switched; and a backlight unit that is arranged at the lowest layer for irradiating light from the backside of the liquid crystal layer.

The liquid crystal device of the present invention that is constructed as described above includes a reflective structural layer below the liquid crystal layer, and this reflective structural layer includes a plurality of reflectors that, by means of Bragg reflection, reflect only light of a specific frequency band wherein the reflectance of each reflector can be electrically switched. In other words, the use of Bragg reflection realizes a liquid crystal display device that allows switching between reflective and transmissive display that is brighter than a liquid crystal display device that employs a semi-transmissive surface. Further, full-color display is possible if each of the reflectors of the reflective structural layer is constructed such that each of the reflectors, which use Bragg reflection to reflect only light of a specific frequency band, reflects only blue, or reflects only green, or reflects only red.

Further, the thickness of at least one of the substrates that sandwich the liquid crystal layer of the liquid crystal display device of the present invention may be a thickness that does not produce parallax, and this substrate may be a film substrate or a thin-film glass.

In addition, the liquid crystal display device of the present invention may include a first color filter layer that is arranged above the liquid crystal layer, and further, may include a second color filter layer that is arranged below the reflective structural layer. In the case of a construction having a second color filter layer in addition to the first color filter layer in particular, the use of a layer having high transmittance and low color purity as the first color filter layer and a layer having high transmittance and low color purity as the second color filter layer enables a device having characteristics in which high reflectance is obtained during reflective display and a high color purity is obtained during transmissive display.

Each of the reflectors may be a unit that is formed by stacking in the direction of stacking of the liquid crystal layer and backlight unit with respect to the reflective structural layer.

In addition, the reflectors may each be arranged parallel to a direction that is substantially orthogonal to the direction of stacking of the liquid crystal layer and backlight unit with respect to the reflective structural layer. In this case, when reflectors that reflect blue, green and red are each arranged parallel, full-color display can be realized without providing a color filter, whereby a liquid crystal display device can be obtained that is both bright and that has a simple construction.

Further, each of the reflectors may contain liquid crystal; and in particular, may include cholesteric liquid crystal; may be a structure in which one or more liquid crystal drop layers that contain drops of liquid crystal are alternately stacked with one or more polymer layers; or may be a polymer layer that contains drops of cholesteric liquid crystal.

The liquid crystal device of the present invention may include a first polarizer that is arranged above the liquid crystal layer; and may include a second polarizer that is arranged below the liquid crystal layer. In addition, the use of a compensator allows the use of display elements such as STN liquid crystals or birefringence liquid crystals as the liquid crystal display elements instead of TN liquid crystals.

The liquid crystal display device of the present invention may include a compensator for compensating for phase difference that is arranged below the first polarizer and above the second polarizer; and the compensator may be arranged above the reflective structural layer.

Finally, the liquid crystal layer may be driven by an active matrix.

BRIEF DESCRIPTION OF DRAWINGS

FIG. 6 is a view for giving a summary of the method of producing an HPDLC layer.

FIG. 7 is a schematic side sectional view showing the construction of three-layer stacked HPDLC layer.

FIG. 12 is a schematic side sectional view showing the basic construction of the liquid crystal display device shown in FIG. 11.

FIG. 13 is a schematic side sectional view of an example of a liquid crystal display device of the prior art having a holographic reflecting layer.

FIG. 14 is a view for explaining functions of a hologram and the characteristics of a liquid crystal display device of the prior art having a holographic reflecting layer.

DETAILED DESCRIPTION OF THE INVENTION

Explanation next regards embodiments of the present invention with reference to the accompanying drawings. In the explanations of each of the embodiments, holographic polymer dispersed liquid crystal is abbreviated as "HPDLC."

(First Embodiment)

Figure 1:
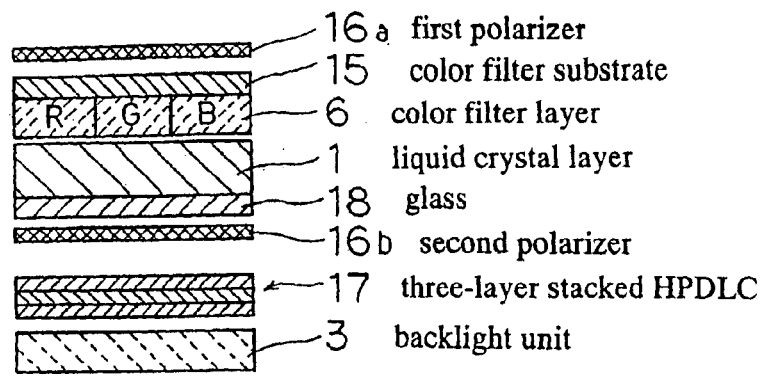
FIG. 1 is a side sectional view showing details of the construction of an example of a liquid crystal display device in the first embodiment of the present invention.

We first refer to FIG. 1, in which is shown a side sectional view of the details of the construction of an example of the liquid crystal display device of the present embodiment.

The liquid crystal display device is of a construction that includes: first polarizer 16a that formed on the top layer; below first polarizer 16a, color filter layer 6 that is composed of filters that each transmit only R (red), G (green), or B (blue) and in which color filter substrate 15 is formed as the upper layer side; below color filter layer 6, liquid crystal layer 1 that is formed on glass 18 for projecting image information; second polarizer 16b that is below liquid crystal layer 1, i.e., below glass 18; three-layer HPDLC 17 having reflectors in which reflectance can be electrically switched that is arranged below second polarizer 16b, i.e., that is below liquid crystal layer 1; and then, on the lowest layer, backlight unit 3, which is the lighting for irradiating light from the backside of the liquid crystal layer 1.

Liquid crystal layer 1 may be a nematic liquid crystal such as TN liquid crystal and STN liquid crystal, or may be a birefringence liquid crystal such as homeotropic liquid crystal and OCB liquid crystal.

An outline of the method of forming liquid crystal layer 1 is next described.

Alignment layers are first formed on both of glass substrate 18 having transparent electrodes and color filter substrate 15 having color filter layer 6 and transparent electrodes. The transparent electrodes on the two substrates are not shown in FIG. 1. An alignment process is next carried out on the alignment layers, and the two substrates are aligned together with spacers interposed. The substrates are bonded together at this time such that the directions of the alignment processes of the two substrates are mutually orthogonal. The space between the two substrates is then filled with a nematic liquid crystal to complete the formation of liquid crystal layer 1.

The basic principles of the liquid crystal display device of the present embodiment are next explained using FIG. 2, which shows a schematic side sectional view of the basic construction of the liquid crystal display device of the present embodiment.

Figure 2A:
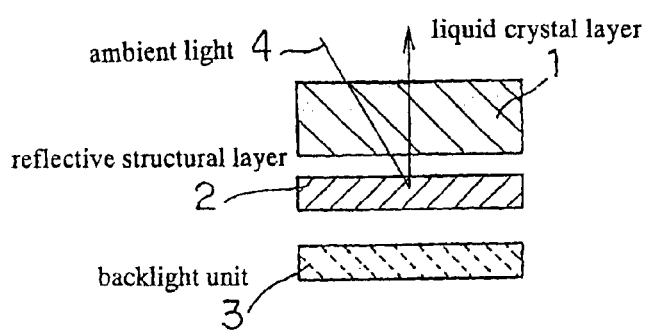
FIG. 2 is a schematic side sectional view showing the basic construction of the liquid crystal display device that is shown in FIG. 1.
Figure 2B:
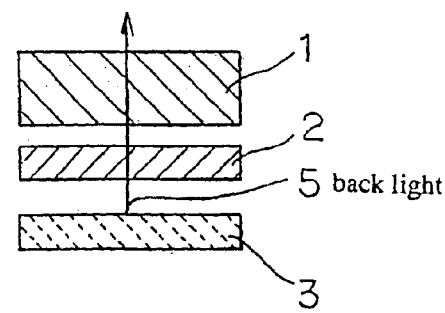
Figure 2C:
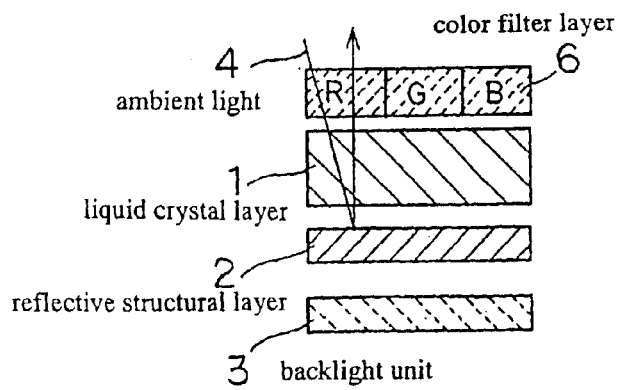
Figure 2D:
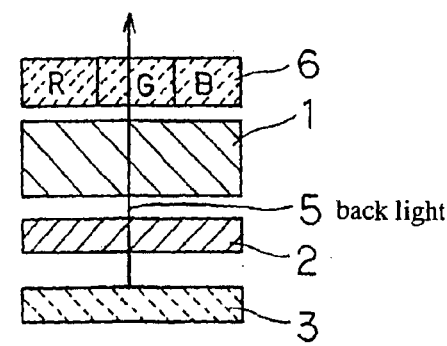

As shown in FIG. 2(a) and FIG. 2(b), the liquid crystal display device of the present embodiment takes as its basic structure: liquid crystal layer 1; reflective structural layer 2, which corresponds to three-layer stacked HPDLC 17; and backlight unit 3; but, as shown in FIG. 2(c) and FIG. 2(d), may also take as its basic structure a construction in which color filter layer 6 is formed on the upper layer of liquid crystal layer 1.

Reflective structural layer 2 may be any construction as long as reflectors can be reversibly switched between a state in which the light reflectance is high but transmittance is low and a state in which light transmittance is high but light reflectance is low; but, as shown below, reflective structural layer 2 is ideally a construction that contains liquid crystal or polymer liquid crystal that allows electrical control of reflectance and that takes advantage of Bragg reflection.

Figure 3A:
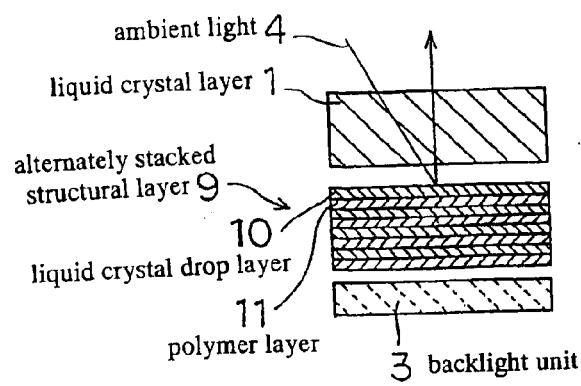
FIG. 3 is a schematic side sectional view showing the construction for a case in which an alternately stacked structure is used as the reflective structural layer.
Figure 3B:
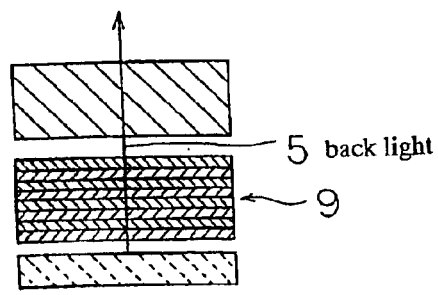
Figure 3C:
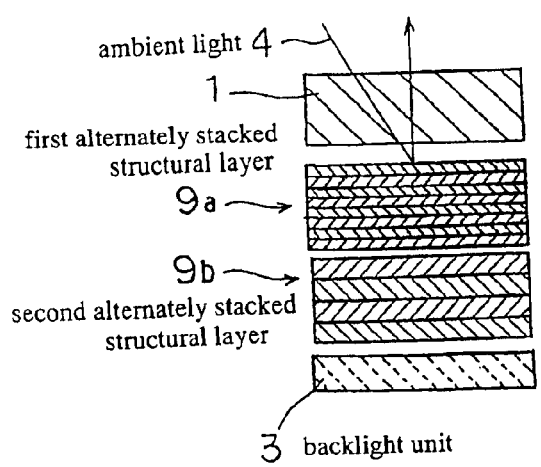
Figure 3D:
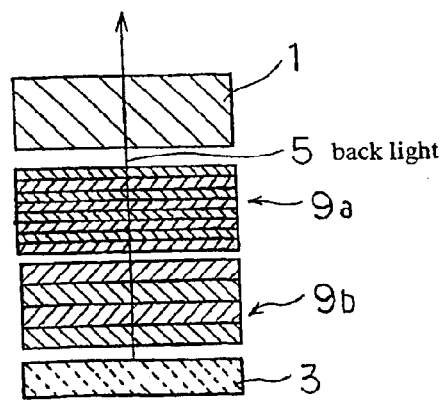

For example, reflective structural layer 2 may be alternately stacked structural layer 9 shown in FIG. 3(a) and FIG. 3(b) in which liquid crystal drop layers 10, which are the reflectors, and polymer layers 11 are alternately stacked. If the refractive index of liquid crystal drop layers 10 and polymer layers 11 is different, ambient light 4 is selectively reflected at a wavelength that is determined by the period of alternation, as shown in FIG. 3(a). When voltage is applied to this alternately stacked structural layer 9, the refractive index of liquid crystal drop layer 10 changes to coincide with the refractive index of polymer layer 11, whereby the selective reflection is canceled to produce a transparent state, and back light 5 from backlight unit 3 can be transmitted as shown in FIG. 3(b). Alternately stacked structural layer 9 may also be stacked first alternately stacked structural layer 9a and second alternately stacked structural layer 9b having different stacking periods, whereby polychromatic light can be reflected, as shown in FIG. 3(c) and FIG. 3(d). In other words, the liquid crystal display device of the present embodiment can realize full-color display if each of a plurality of reflectors such as first alternately stacked structural layer 9a and second alternately stacked structural layer 9b has a structure that takes advantage of Bragg reflection to reflect only light of a specific frequency band.

Figure 4A:
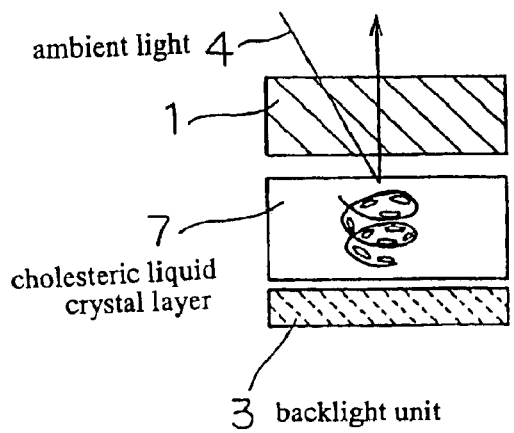
FIG. 4 is a schematic side sectional view showing the construction for a case in which a cholesteric liquid crystal layer is used as the reflective structural layer.
Figure 4B:
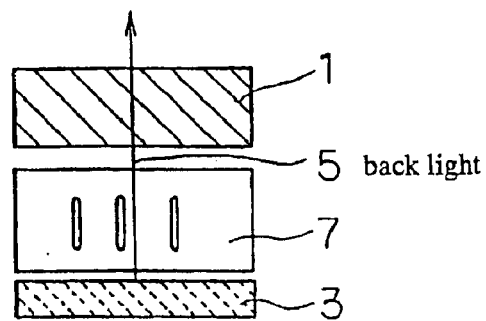
Figure 4C:
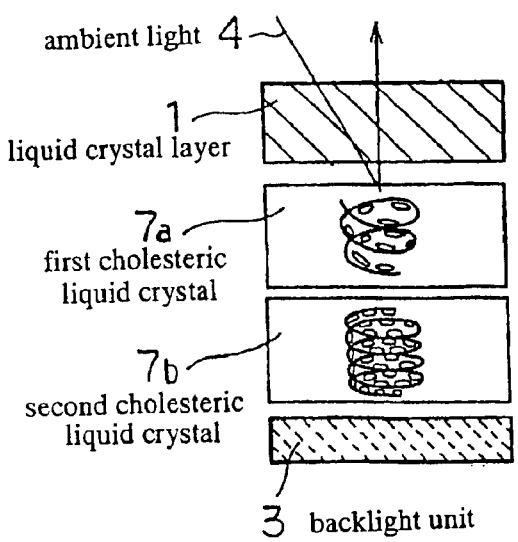
Figure 4D:
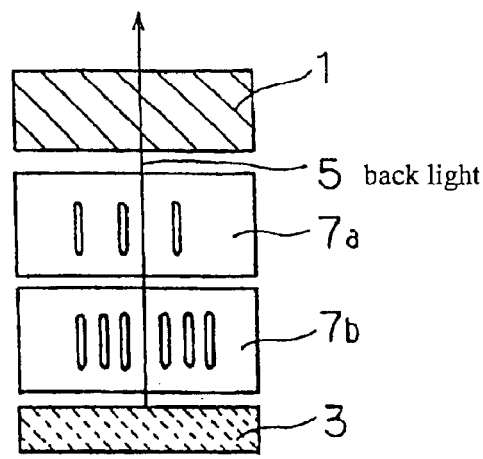

In addition, a cholesteric liquid crystal may also be used as the reflectors of reflective structural layer 2. As is known in the art, the use of cholesteric liquid crystal allows reflectance to be electrically controlled. Since cholesteric liquid crystal layer 7 has a spiral structure as shown in FIG. 4(a), ambient light 4 that corresponds to one half the pitch of this spiral structure is selectively reflected. Moreover, the spiral structure is canceled if voltage is applied to this cholesteric liquid crystal, as shown in FIG. 4(b), whereby the above-described reflectance is lost and all wavelengths of back light 5 are transmitted. An example in which this effect is realized is described in "Switchable mirrors of chiral liquid crystal gels" (LIQUID CRYSTALS, 1999, Volume 26, No. 11, pp. 1645–1653). Further, the use of stacked cholesteric liquid crystal layer 8, in which first cholesteric liquid crystal 7a and second cholesteric liquid crystal 7b having different spiral pitches are stacked, as reflective structural layer 2 as shown in FIG. 4(c) and FIG. 4(d) enables the reflection of polychromatic light, similar to alternately stacked structural layer 9.

In this way, each reflector of reflective structural layer 2 may be formed by stacking in the direction in which liquid crystal layer 1 and backlight unit 3 are stacked with respect to reflective structural layer 2.

Figure 5A:
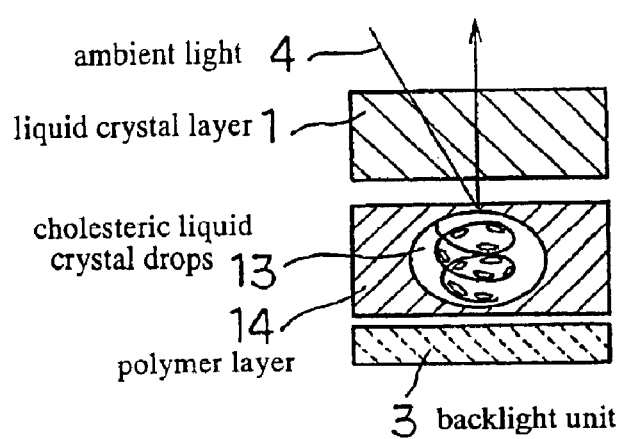
FIG. 5 is a schematic side sectional view showing the construction for a case in which a polymer layer that contains cholesteric liquid crystal drops is used as the reflective structural layer.
Figure 5B:
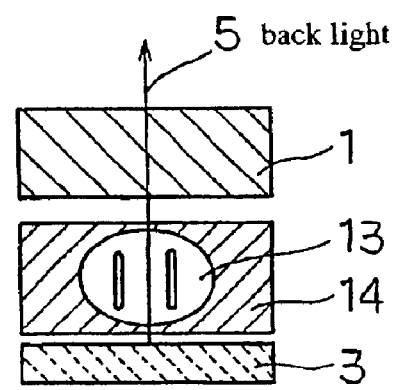

Alternatively, reflective structural layer 2 may also be a structure in which reflectors are constituted by polymer layers that contain cholesteric liquid crystal drops, as shown in FIG. 5(a) and FIG. 5(b). The application of voltage to polymer layer 14, which contains cholesteric liquid crystal drops 13 composed of cholesteric liquid crystal of a spiral pitch that selectively reflects ambient light 4, cancels the spiral structure in cholesteric liquid crystal drops 13 to produce a transparent state, thereby allowing transmission of back light 5. Moreover, a polymer layer that contains cholesteric liquid crystal drops that contain a plurality of cholesteric liquid crystals of differing spiral pitches can selectively reflect polychromatic light.

We next refer to FIG. 6 and FIG. 7 to explain details of the structure and a method of producing the stacked structure of HPDLC, which is alternately stacked structural layer 9.

First, as shown in FIG. 6(a), liquid crystal/photo-curing substance composite layer 20, i.e., a layer composed of a composite of liquid crystal and a photo-sensitive substance, is formed on substrate 19 having transparent electrodes (not shown in the figure).

Next, as shown in FIG. 6(b), laser light 21 emitted from the same laser is branched and the two light beams are caused to intersect inside liquid crystal/photo-curing substance composite layer 20, whereby the laser light interference causes strong and selective photo-curing in areas where laser intensity is high. In areas where laser intensity is low, the liquid crystal is separated as liquid drops. The foregoing process results in HPDLC layer 22 that is composed of a liquid crystal drop layer and photo-cured polymer layer as shown in FIG. 6(c). A difference between the refractive indices of the liquid crystal drop layer and polymer layer results in selective reflection of light of a wavelength that corresponds to the stacking period of the alternately stacked structure. Photo-curing is next carried out in a nitrogen atmosphere or under reduced pressure if the photo-curing substance is impeded by oxygen. The stacking period of this alternately stacked structure can be determined by the wavelength of the laser light and the angle of intersection. If a liquid crystal/photo-curing substance composite layer is again formed on completed HPDLC layer 22 of FIG. 6(c) and exposed at an altered laser wavelength and intersection angle, an HPDLC layer having two layers of different alternately stacking periods can be obtained. If the above-described layer formation and exposure are carried out, for example, three times, the HPDLC layer can be made a three-layer stacked HPDLC layer 17 that is composed of Blue HPDLC 23 for reflecting blue, Green HPDLC 24 for reflecting green, and Red HPDLC 25 for reflecting red, as shown in FIG. 7. In this case, transparent electrodes 26 are electrically connected to Blue HPDLC 23 and Red HPDLC 25.

When stacking, the order of stacking is preferably blue, green and red if light is incident from the upper surface of the stacked layers. This order is preferred because light is more easily scattered with shorter wavelengths. This three-layer stacked HPDLC layer 17 reflects white light. Applying voltage to this three-layer stacked HPDLC layer 17 causes the refractive index of the liquid crystal drop layer to change. If the refractive index of the liquid crystal drop layer matches that of the polymer layer, the selective light reflection is canceled to produce a transparent state.

In the present embodiment, the reflectance of three-layer stacked HPDLC layer 17 is high when voltage is not applied. Accordingly, display operation is enabled by supplying voltage to only liquid crystal layer 1 without supplying voltage to three-layer stacked HPDLC layer 17, and extra power is therefore not needed during reflective display. In addition, transmissive display can be obtained by supplying voltage to stacked HPDLC layer 22 to produce a transparent state and lighting up backlight unit 3.

According to the liquid crystal display device of the present embodiment as described in the foregoing explanation, a layer that contains polymer liquid crystal or liquid crystal that uses Bragg reflection is formed as reflective structural layer 2 between liquid crystal layer 1 and backlight unit 3 to enable full color reflective display in bright surroundings and full-color transmissive display in dark surroundings.

(Second Embodiment)

Figure 8A:
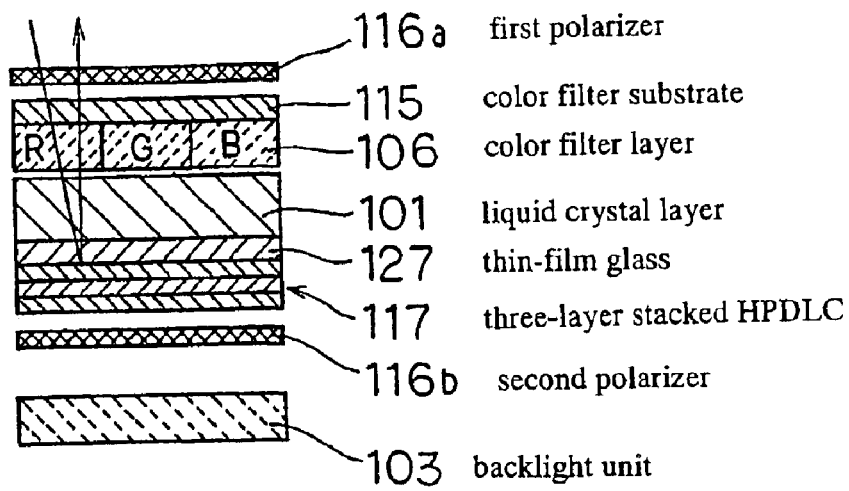
FIG. 8 is a side sectional view showing details of the construction of an example of a liquid crystal display device of the second embodiment of the present invention.
Figure 8B:
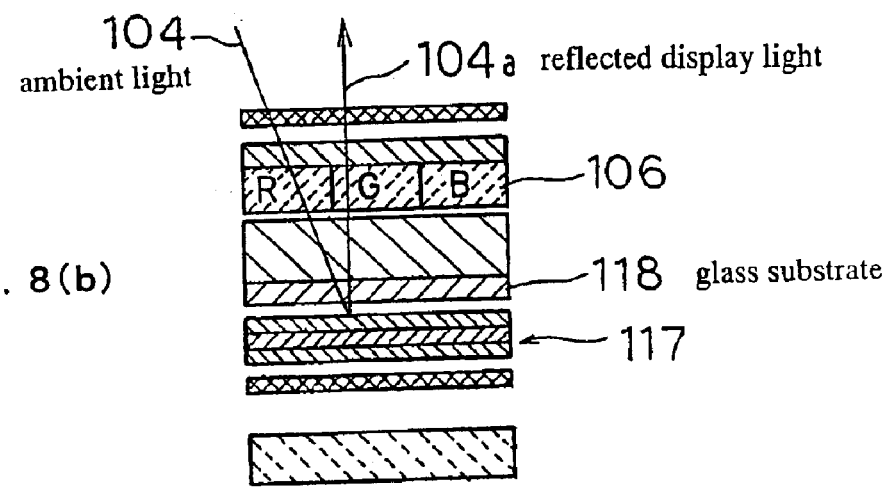
Figure 8C:
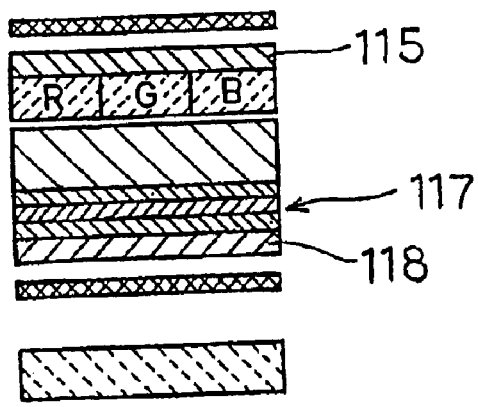

We next refer to FIG. 8, in which is shown a side sectional view showing the details of the construction of an example of a liquid crystal display device of the present embodiment.

As shown in FIG. 8(*a*), liquid crystal display device of this embodiment is a construction including, in order from the uppermost layer: first polarizer 116*a*, color filter substrate 115, color filter layer 106, liquid crystal layer 101, thin-film glass 127, three-layer stacked HPDLC 117, second polarizer 116*b*, and, at the lowermost layer, backlight unit 103.

The liquid crystal display device of the present embodiment therefore differs from the liquid crystal display device of the first embodiment in that thin-film glass 127 and three-layer stacked HPDLC. 117 are stacked together between liquid crystal layer 101 and second polarizer 116.

Further, in the liquid crystal display device of the present embodiment, only first polarizer 116*a* contributes to display during reflective display. This display mode is known as single-polarizer mode. A brighter reflective display can be obtained than by a mode in which two polarizers are used during reflective display. At this time, a twisted-nematic liquid crystal mode is used as liquid crystal layer 101. The design of this twisted-nematic liquid crystal is described in "Analysis of operation mode of reflective liquid crystal display devices" (LIQUID CRYSTALS, 1999. Vol. 26, No. 11, pp. 1573–1578).

Apart from the above-described points, the present embodiment is basically the same as the liquid crystal display device of the first embodiment, and further detailed explanation is therefore omitted.

A summary of the procedures for producing a liquid crystal display device of the present embodiment is next described.

As with the first embodiment, color filter substrate 115 having transparent electrodes is aligned with a glass substrate. One of the substrates is converted to a thin film to produce thin-film glass 127. This conversion to a thin film can be realized by either grinding or chemically etching the glass substrate. Clearly, a thin film such as a polymer film may also be used in place of a glass substrate. Liquid crystal is next injected to form liquid crystal layer 101. The direction of orientation of the two substrates is then adjusted to form a prescribed twisted-nematic structure, whereby the liquid crystal panel having thin-film glass 127 is completed. First polarizer 116*a* is bonded to the upper surface of the completed liquid crystal panel. In addition, three-layer stacked HPDLC 117 is bonded to the lower surface of the liquid crystal panel, and further, second polarizer 116 is bonded to the lower surface of three-layer stacked HPDLC 117. Backlight unit 103 is then arranged to complete the production of the device.

Next, regarding the reason for using thin-film glass 127, we refer to FIG. 8(*b*). FIG. 8(*b*) shows a construction in which glass 118 that has not been converted to a thin film is used instead of thin-film glass 127. During reflective display, ambient light 104 is incident from an oblique direction. Thus, when glass substrate 118 is thick and distant from three-layer stacked HPDLC 117, Which is the reflection plane, ambient light 104 that has been transmitted in by R of color filter layer 106 is then transmitted out by neighboring picture element G as reflected display light 104*a*. In other words, the problem of parallax occurs. To prevent this problem of parallax, thin-film glass 127 must be formed as shown in FIG. 8(*a*).

To prevent reflective display light leakage from a neighboring picture element, three-layer stacked HPDLC layer 117 may be incorporated between color filter substrate 115 and glass substrate 118, i.e., built into the interior of the liquid crystal panel, as shown in FIG. 8(*c*).

The liquid crystal display device of the present embodiment according to the foregoing explanation not only eliminates parallax through the use of thin-film glass 127, but can also realize full-color reflective display in bright surroundings and full-color transmissive display in dark surroundings as in the first embodiment by forming, as reflective structural layer 102, a layer that contains liquid crystal or polymer liquid crystal and that takes advantage of Bragg reflection between liquid crystal layer 101 and backlight unit 103.

(Third Embodiment)

FIG. 9 shows a side sectional view of the details of the construction of an example of the liquid crystal display device of the present embodiment, and FIG. 10 shows the basic construction of the liquid crystal display device of the present embodiment.

As shown in FIG. 9(*a*), the liquid crystal display device of the present embodiment is a construction that includes, in order from the uppermost layer: first polarizer 216*a*, color filter substrate 215, first color filter layer 206*a*, liquid crystal layer 201, glass 218, three-layer stacked HPDLC 217, second polarizer 216*b*, second color filter layer 206*b*, and, at the lowermost layer, backlight unit 203. As with first color filter layer 206*a*, which is formed on color filter substrate 215, second color filter layer 206*b* is formed on a color filter substrate, but for the sake of simplification, the color filter substrate of second color filter layer 206*b* is not shown in FIG. 9.

As shown in FIG. 10, the liquid crystal display device of the present embodiment differs from the liquid crystal display device of the first and second embodiments in that second color filter layer 206b is provided between backlight unit 203 and reflective structural layer 202, which corresponds to three-layer stacked HPDLC 217; i.e., below reflective structural layer 202. Apart from the above-described difference, the construction is basically the same as that of the first embodiment, and detailed explanation is therefore omitted.

In the case of the present embodiment, first color filter layer 206a and second color filter layer 206b are arranged such that each picture element is matched mutually. In other words, each of picture elements A, B, and C of first color filter layer 206a matches the position of each of picture elements A, B, and C, respectively, of second color filter layer 206b. As shown in FIG. 10(b), this arrangement allows, for example, during transmissive display, back light beam 205 from backlight unit 203 that is transmitted out by picture element B of second color filter layer 206b to be transmitted by picture element B of first color filter layer 206a. For full-color display, each color of A, B, and C is generally selected as red (R), green (G), and blue (B).

Meanwhile, the transmittance and color purity of a color filter are in a reciprocal relationship, and a color filter having high transmittance therefore has low color purity, and a color filter having high color purity has low transmittance. When a liquid crystal display device has only one color filter layer having this characteristic, light is transmitted by the color filter layer two times during reflective display: at the time of incidence and reflection; and transmitted by the color filter layer only once during transmissive display: as transmissive display light. As a result, although the use of a color filter having high transmittance enables high reflectance to be obtained during reflective display, color purity during transmissive display is low. Conversely, the use of a color filter having low transmittance enables high color purity to be obtained during transmissive display, but reflectance is low during reflective display. It is therefore problematic for a construction having only one color filter layer to obtain both high reflectance during reflective display and high color purity during transmissive display.

Figure 10A:
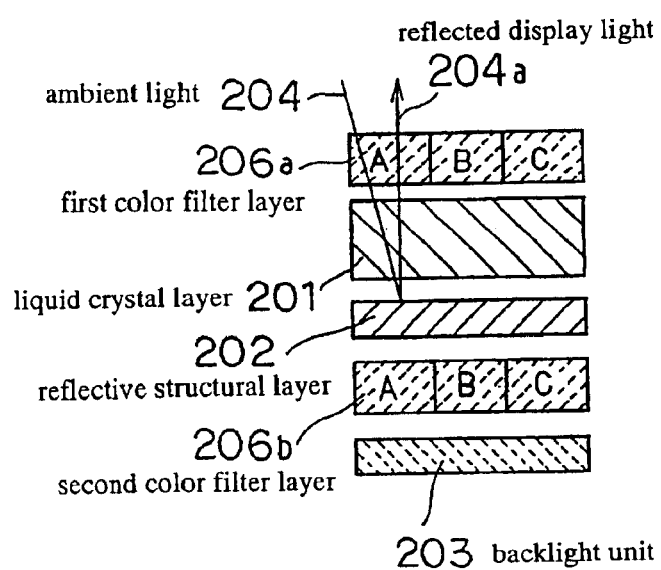
FIG. 10 is a schematic side sectional view showing the basic construction of the liquid crystal display device shown in FIG. 9.
Figure 10B:
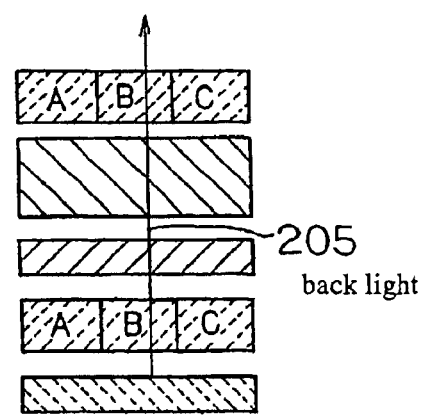

In the construction of the present embodiment, reflected display light 204a is transmitted by only first color filter layer 206a during reflective display as shown in FIG. 10(a), while back light 205 is transmitted by both of second color filter layer 206b and first color filter layer 206a during transmissive display, as shown in FIG. 10(b). Thus, for example, if a layer having high transmittance and low color purity characteristics is used as first color filter layer 206a and a layer having high transmittance and low color purity is used as second color filter layer 206b, a display having the characteristics of high reflectance during reflective display and high color purity during transmissive display can be obtained. In addition, a variety of combinations of the reflectance and color purity characteristics of first color filter layer 206a and second color filter layer 206b enables desired transmittance and color purity to be obtained, whereby higher reflectance during reflective display and higher color purity during transmissive display can be obtained at high level than in a liquid crystal display device of a construction that employs one color filter layer.

Figure 9A:
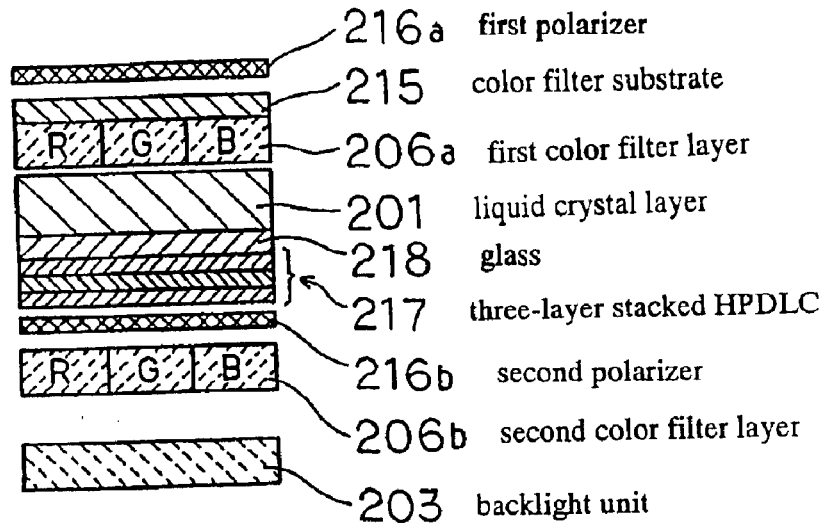
FIG. 9 is a side sectional view showing details of the construction of an example of a liquid crystal display device of the third embodiment of the present invention.
Figure 9B:
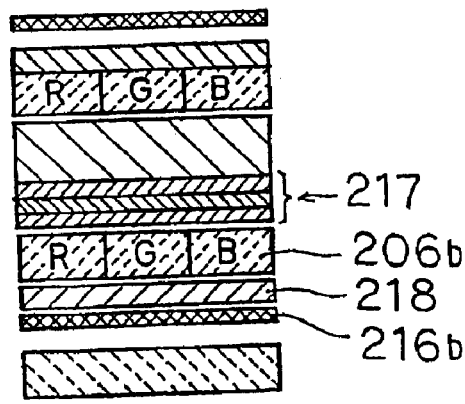
Figure 9C:
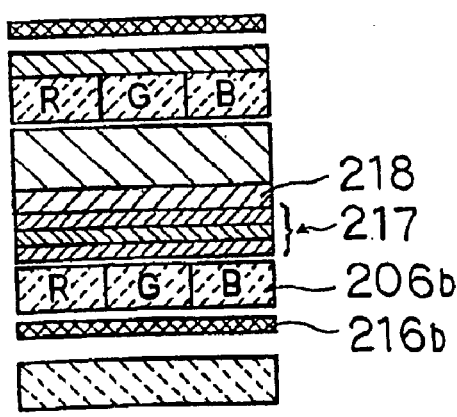
Figure 9D:
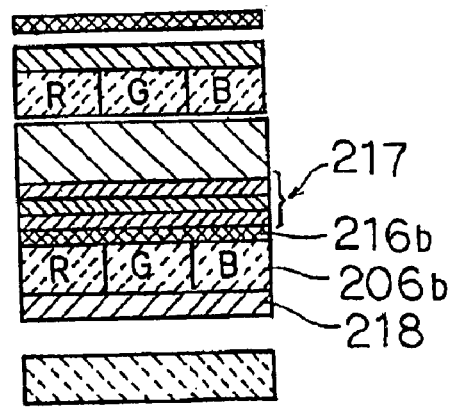

In the construction of a liquid crystal display device of the present embodiment, second color filter layer 206b is basically preferably below reflective structural layer 202, i.e., below three-layer stacked HPDLC 217 in FIG. 9; and as constructions other than that of FIG. 9(a), glass 218 and second polarizer 216b may be arranged as shown in FIG. 9(b) to FIG. 9(d). Alternatively, it should be clear that the thin-film glass that was described in the second embodiment can be similarly used to eliminate parallax.

The liquid crystal display device of the present embodiment as described in the foregoing explanation not only enables higher reflectance during reflective display and higher color purity during transmissive display than a liquid crystal display device of a construction that employs one color filter layer, but also, as with the first and second embodiments, enables full-color reflective display in bright surroundings and full-color transmissive display in dark surroundings by forming a layer that contains liquid crystal or a polymer liquid crystal that uses Bragg reflection as reflective structural layer 202 between liquid crystal layer 201 and backlight unit 203.

(Fourth Embodiment)

FIG. 11 is a side sectional view showing the details of the construction of an example of a liquid crystal display device of the present embodiment, and FIG. 12 shows the basic construction of the liquid crystal display device of the present embodiment.

Figure 11A:
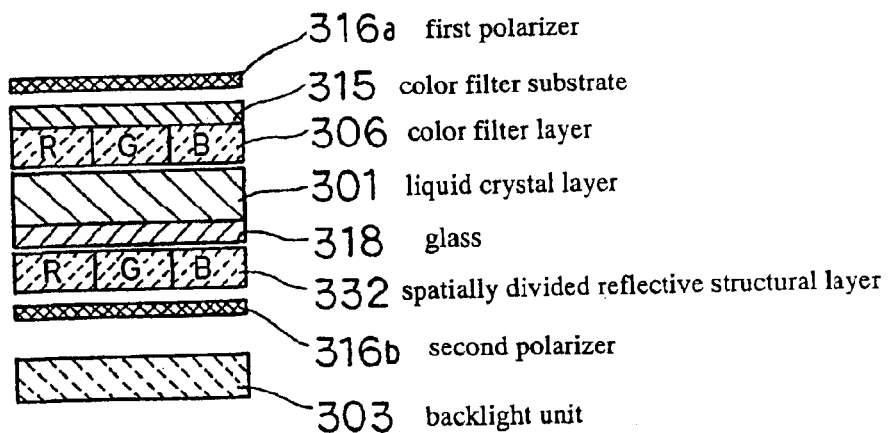
FIG. 11 is a side sectional view showing details of the construction of an example of a liquid crystal display device of the fourth embodiment of the present invention.

As shown in FIG. 11(a), the liquid crystal display device of the present embodiment is of a construction that includes, in order from the uppermost layer: first polarizer 316a, color filter substrate 315, color filter layer 306, liquid crystal layer 301, glass 318, spatially divided reflective structural layer 332 having a plurality of areas that reflect only light of a wavelength that corresponds to each picture element of color filter layer 306, second polarizer 316b, and, as the lowermost layer, backlight unit 303.

As shown in FIG. 12, in the liquid crystal display device of the present embodiment, spatially divided reflective structural layer 332 is provided between backlight unit 303 and liquid crystal layer 301, i.e., below liquid crystal layer 301. Apart from this point, the construction of the present embodiment is basically the same as the first embodiment, and detailed explanation is therefore here omitted.

As shown in FIG. 12(a), the area of spatially divided reflective structural layer 332 is spatially divided so as to correspond to each of picture elements A, B, and C of color filter layer 306, and each of areas A, B, and C of spatially divided reflective structural layer 332 reflects only light of the wavelength band that corresponds to each of picture elements A, B, and C, respectively, of color filter layer 306. During full-color display, each of picture elements A, B, and C of color filter layer 306 selects and transmits the wavelength band of red (R), green (G) and blue (B), respectively; and in concert with this action, each of areas A, B, and C of spatially divided reflective structural layer 332 reflects light of only the wavelength bands of red (R), green (G), and blue (B), respectively. In other words, spatially divided reflective structural layer 332 has characteristics that are combined from the characteristics of the color filter and the characteristics of the reflective structural layer. Further, this spatially divided reflective structural layer 332 can be placed in a transparent state by means of electrical control. Moreover, each of the areas of spatially divided reflective structural layer 332 may be constructed using the above-described HPDLC element or cholesteric liquid crystal layer.

The spatial division described above means that each reflector (each of areas A, B, and C of spatially divided reflective structural layer 332 in FIG. 12) is arranged in parallel in a direction that is substantially orthogonal to the direction in which liquid crystal layer 301 and backlight unit 303 are stacked with respect to spatially divided reflective structural layer 332, which is the reflective structural layer.

In the above-described construction, during reflective display, ambient light 304 is transmitted by color filter layer 306 and liquid crystal layer 301 before reaching spatially divided reflective structural layer 332, as shown in FIG. 12(a). This spatially divided reflective structural layer 332 reflects only light of wavelength bands that correspond to the color filter colors. In FIG. 12(a), A of spatially divided reflective structural layer 332 reflects only light of the wavelength band that corresponds to A of color filter layer 306. After reflection, reflected display light 304a is transmitted by liquid crystal layer 301 and color filter layer 306. As a result, light during reflective display is transmitted by color filter layer 306 two times. However, light of other wavelength bands is not reflected from spatially divided reflective structural layer 332. Mixing with colors of other wavelength bands therefore does not occur and the color purity does not drop even if a layer of low transmittance is used in color filter layer 306. In addition, if electrical control of spatially divided reflective structural layer 332 is applied to produce a transparent state, back light 305 from backlight unit 303 can be transmitted by spatially divided reflective structural layer 332 and full-color transmissive display can be realized, as shown in FIG. 12(b).

Figure 11B:
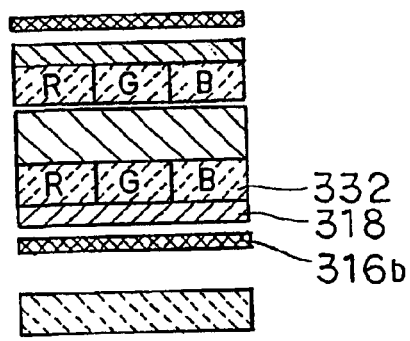
Figure 11C:
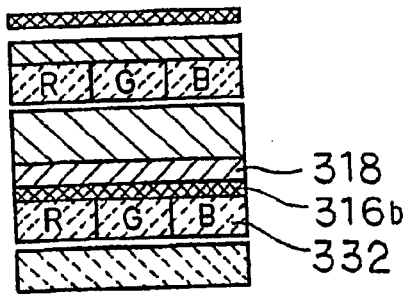

In the construction of the liquid crystal display device of the present embodiment, spatially divided reflective structural layer 332 is basically preferably arranged below liquid crystal layer 301, and as constructions other than the one shown in FIG. 11(a), glass 318 and second polarizer 316b may be arranged as shown in FIG. 11(b) to FIG. 11(c). In addition, it goes without saying that parallax is eliminated if the thin-film glass described in the second embodiment is similarly used.

In the case of the present embodiment, full-color display is theoretically possible even if the construction lacks color filter layer 306, and the construction may therefore be provided with color filter layer 306 when a further improvement in color purity is desired or when the color purity of spatially divided reflective structural layer 332 changes due to the viewing angle.

As described in the foregoing explanation, the liquid crystal display device of the present embodiment can not only obtain, at high level, high reflectance during reflective display and high color purity during transmissive display by means of a simple construction having only one color filter layer 306 through the use of spatially divided reflective structural layer 332, but can realize full-color reflective display in bright surroundings and full-color transmissive display in dark surroundings as in the first and third embodiments by forming, as spatially divided reflective structural layer 332, a layer that uses Bragg reflection and that contains liquid crystal or polymer liquid crystal between liquid crystal layer 301 and backlight unit 303.

In the liquid crystal display devices of each of the above-described embodiments, a compensator that is below a first polarizer, which is the uppermost layer, and above a second polarizer may be a stacked component, and further, may be a component that is arranged above the reflective structural layer. The use of this compensator enables the use of display elements other than TN liquid crystals such as STN liquid crystal or birefringence liquid crystal as liquid crystal display elements.

In addition, the liquid crystal layer of each of the embodiments may be driven by an active matrix, whereby a high contrast ratio can be maintained during reflective and transmissive display with a large display capacity.

What is claimed is:

1. A liquid crystal display device comprising:
   a liquid crystal layer;
   a reflective structural layer that is arranged below said liquid crystal layer and that includes a plurality of reflectors for reflecting only light of specific frequency bands by means of Bragg reflection, wherein reflectance of each of said reflectors can be electrically switched;
   a backlight unit that is arranged at the lowermost layer for irradiating light from the backside of the liquid crystal layer;
   a first color filter layer that is arranged above said liquid crystal layer; and
   a second color filter layer that is arranged below said reflective structural layer.

2. A liquid crystal display device according to claim 1, wherein said liquid crystal layer is on a substrate that is a thin-film glass.

3. A liquid crystal display device according to claim 1, wherein said liquid crystal layer is on a substrate that is a film substrate.

4. A liquid crystal display device according to claim 1, wherein each of said reflectors is formed by stacking in the direction of stacking of said liquid crystal layer and said backlight unit with respect to said reflective structural layer.

5. A liquid crystal display device according to claim 1, wherein each of said reflectors contains liquid crystal.

6. A liquid crystal display device according to claim 5, wherein each of said reflectors contains cholesteric liquid crystal.

7. A liquid crystal display device according to claim 5, wherein each of said reflectors is a construction in which one or more liquid crystal drop layers that contain drops of liquid crystal are alternately stacked with one or more polymer layers.

8. A liquid crystal display device according to claim 5, wherein each of said reflectors is composed of a polymer layer containing drops of cholesteric liquid crystal.

9. A liquid crystal display device according to claim 1, further comprising a first polarizer that is arranged above said liquid crystal layer.

10. A liquid crystal display device according to claim 9, further comprising a second polarizer that is arranged below said liquid crystal layer.

11. A liquid crystal display device according to claim 10, further comprising a compensator for compensating phase difference that is arranged below said first polarizer and above said second polarizer.

12. A liquid crystal display device according to claim 11, wherein said compensator is arranged above said reflective structural layer.

13. A liquid crystal display device according to claim 1, wherein said liquid crystal layer is driven by an active matrix.

14. A liquid crystal display device comprising
   a liquid crystal layer;
   a reflective structural layer that is arranged below said liquid crystal layer and that includes a plurality of reflectors for reflecting only light of specific frequency bands by means of Bragg reflection, wherein reflectance of each of said reflectors can be electrically switched; and
   a backlight unit that is arranged at the lowermost layer for irradiating light from the backside of the liquid crystal layer,
   wherein each of said reflectors is arranged parallel to a direction that is substantially orthogonal to the direction of stacking of said liquid crystal layer and said backlight unit with respect to said reflective structural layer.

15. A liquid crystal display device according to claim 14, further comprising a first color filter layer that is arranged above said liquid crystal layer.

16. A liquid crystal display device according to claim 14, wherein each of said reflectors contains liquid crystal.

17. A liquid crystal display device according to claim 14, further comprising a first polarizer that is arranged above said liquid crystal layer.

* * * * *